Jan. 15, 1924. Re. 15,746

F. WESTERMAN

BEATER

Original Filed Feb. 6, 1922 2 Sheets-Sheet 1

Inventor:
Frederick Westerman.
By: Fisher, Towle, Clapp & Sears
Attys.

Jan. 15, 1924. Re. 15,746

F. WESTERMAN

BEATER

Original Filed Feb. 6, 1922 2 Sheets-Sheet 2

Inventor:
Frederick Westerman.
By: Fisher, Towle, Clapp & Sears
attys.

Reissued Jan. 15, 1924. Re. 15,746

UNITED STATES PATENT OFFICE.

FREDERICK WESTERMAN, OF CHICAGO, ILLINOIS.

BEATER.

Original No. 1,438,281, dated December 12, 1922, Serial No. 534,301, filed February 6, 1922. Application for reissue filed November 26, 1923. Serial No. 677,190.

*To all whom it may concern:*

Be it known that I, FREDERICK WESTERMAN, a citizen of the United States, residing in Chicago, in the county of Cook and State of Illinois, have invented certain new and useful Improvements in Beaters, of which the following is a specification.

This invention relates to apparatus for agitating, mixing, beating or whipping liquids, or semi-liquids, but more particularly to such as is used by confectioners, bakers and other makers of food products.

The primary object of the present invention is to provide a simple and improved apparatus of this class which will efficiently operate upon large quantities of material.

The many other objects and advantages of my improved apparatus will be better understood by reference to the following specification when considered in connection with the accompanying drawings illustrating a selected embodiment thereof, in which:—

Figure 1:
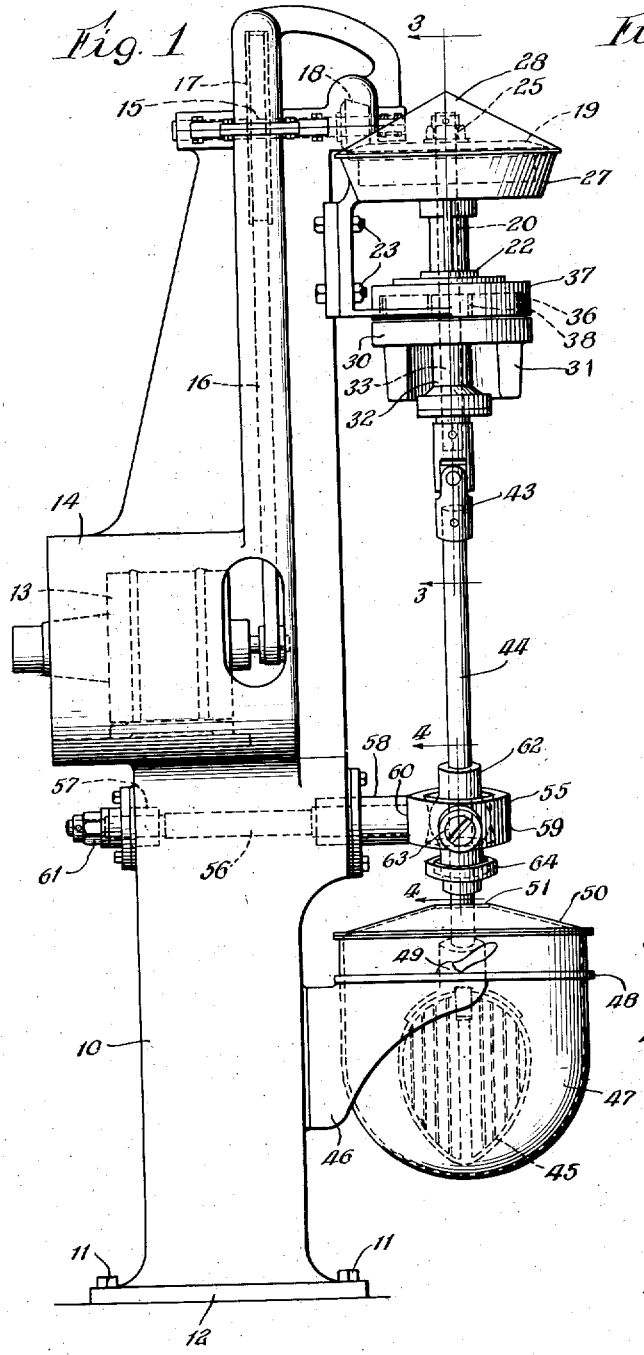
Fig. 1 is a side elevation of the beating apparatus.
Figure 2:
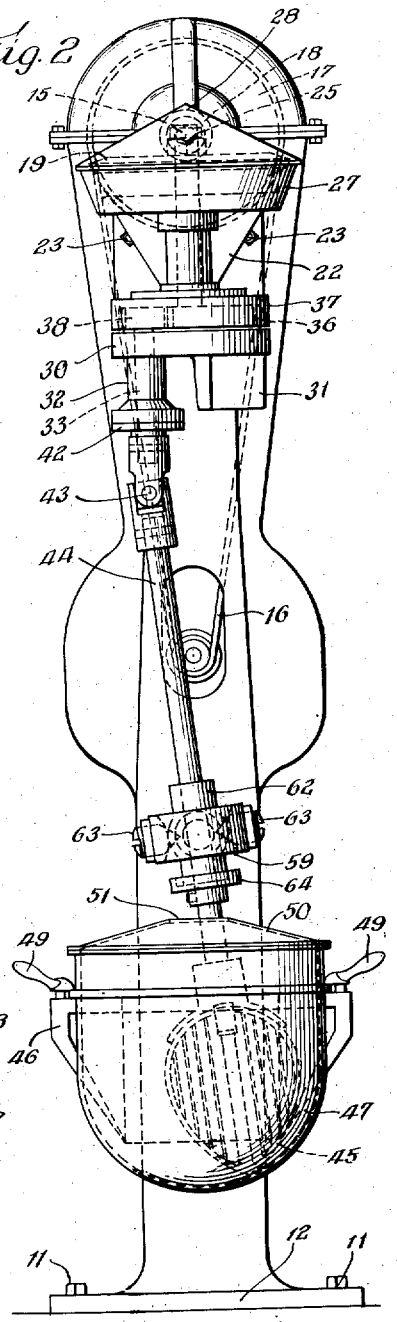
Fig. 2 is the same as Fig. 1, front elevation.
Figure 3:
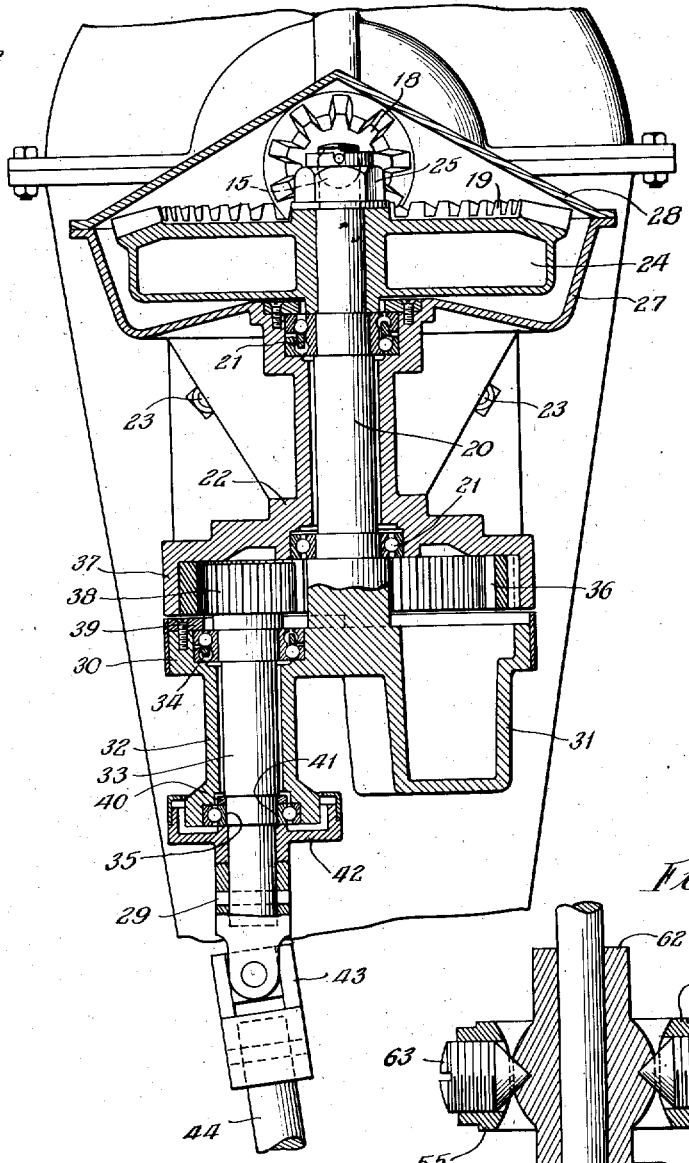
Fig. 3 is an enlarged vertical section on the line 3—3 of Fig. 1.
Figure 4:
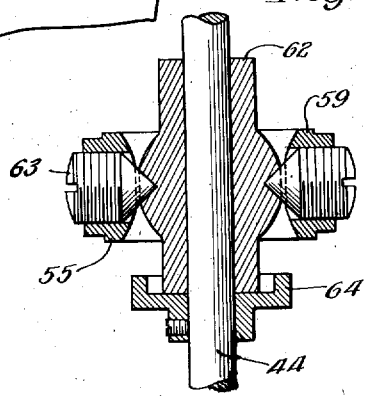
Fig. 4 is an enlarged vertical section on the line 4—4 of Fig. 1.

Referring to the drawings, the beater is provided with a vertical standard or column 10 which is adapted to be secured upon any suitable support by means of bolts 11 passing through the base plate 12. A motor 13 of proper size is mounted on the column 10 in the housing 14. A horizontal shaft 15 is revolubly mounted in suitable bearings on the column 10, and this shaft is driven by the motor 13 through the medium of the belt 16 operating over the pulley 17. A bevel gear 18 on the inner or forward end of the shaft 15 meshes with a gear 19 keyed on the upper extremity of a vertical shaft 20.

The shaft 20 is supported in bearings 21 in the bracket 22 secured on the front face of the column 10 by bolts 23. The gear 19 in the present embodiment contains a chamber 24 within which molten lead may be poured to provide proper counterbalance. This gear 19 is retained upon the shaft 20 by a nut 25.

A pan 27 is provided on the upper portion of the bracket 22 to prevent the dripping of oil and form with the cover 28 a housing for the gear 19. A crank 30 is formed on the lower end of the shaft 20 and the offset weight of the crank is counterbalanced by lead deposited in sufficient quantity in a receptacle 31 provided for the purpose.

A vertically disposed sleeve 32 is formed on the outer end of the crank 30 and a shaft 33 is supported in bearings 34 and 35 in this sleeve. An internal gear 36 is secured within the housing 37 on the bracket 22 and a pinion 38 on the upper end of the shaft 33 meshes with this gear. A washer 39 is secured upon the upper face of the crank 30 beneath the pinion 36 and another washer 40 fits on the reduced lower portion 41 of the shaft above the bearing 35. An oil pan 42 is carried on the shaft 33 below the bearing 38.

A universal joint 43 is secured upon the lower end of the shaft 33 by means of a pin 29 passing through the end portion of the shaft. This joint connects the lower end of the shaft 33 with the upper end of a paddle shaft 44 having a paddle 45 secured on its lower extremity. Any suitable type of paddle may be used.

A bracket 46 on the lower portion of the column supports the usual receptacle within which the paddle 45 operates. The receptacle 47 in the present embodiment is provided on its outer wall with a flange or ring 48 which rests on the bracket 46 and is locked thereon by clamps 49 to firmly position the receptacle on the bracket. A cover 50 fits on the top of the receptacle and is provided with a small central opening 51 to permit the passage of the shaft 44 therethrough.

The shaft 33 is given a combined rotation and revolution by the rotation of the shaft 20, due to the meshing of the pinion 38 and the gear 34, and this movement is transmitted to the upper end of the paddle shaft 44 by the universal joint 43. The shaft 44 is connected to the column 10 slightly above the cover of the receptacle by a support 55 somewhat resembling a gimbal joint. This support permits the free rotation of the shaft but converts the simple movement of revolution into one in which the portions of the shaft above and below the support trace conical surfaces with the apices of the cones at the fixed center of the support. This movement of the shaft 44 about a fixed center located intermediate its ends will be hereinafter referred to as the conical movement of the paddle shaft. The paddle 45 is moved about the receptacle and simultaneously rotated about its axis.

In the support 55, a horizontal shaft 56 projects through the column 10 and is revoluble in bearings 57 and 58 bolted thereto. A ring 59 is formed on the outer end of this shaft and this ring is held against the end 60 of the bearing 58 by the adjustable nut 61 on the inner end of the shaft. A sleeve 62 is supported in the ring 59 by a pair of oppositely disposed pivots 63 having their common axes at a right angle to the axis of the shaft 56 and intersecting the same at the center of the ring 59. This sleeve closely fits about the shaft 44 and forms a bearing therefor. The point of intersection of these axes is the fixed center about which the shaft 44 moves. An oil pan 64 is secured to the shaft 44 below the support 55.

It has been common practice in beaters of this class to move the paddle about the receptacle and at the same time cause it to be rotated about its own axis, but this was accomplished by moving the paddle shaft in parallel relation with the operating shaft. Such a mode of operation required that the receptacle be practically uncovered or that a very large opening be provided in the cover to permit the movement of the paddle shaft. My improved beater construction makes it possible to practically completely cover the receptacle. The support is preferably located as near to the cover as possible and, when so placed, the portion of the shaft passing through the cover will move in an arc only slightly greater than the diameter of the shaft itself, although the beater will move completely around the receptacle. The support 55 further stiffens the shaft 44 and causes the paddle to operate more satisfactorily, particularly in materials of thick consistency.

In the prior construction of beaters of this general type, it has heretofore been customary to employ a short paddle shaft (to avoid lateral strain thereon) and this necessitates bringing the driving mechanism for said shaft close to the receptacle for the material being mixed. An objection to this construction is that the vapors rising from the receptacle during the mixing operation tend to solidify and gum up the oil used in the gearing and bearings close above it and this is a serious objection. By my present invention, the receptacle can be arranged at a considerable distance below the driving mechanism and the paddle shaft can be made of much greater length. A further advantage of my invention is that by causing the paddle shaft to revolve and travel within the receptacle at an angle, the paddle tends to pick up the liquid being mixed and thus insures a more effective and quicker mixing of the material.

I am aware that many changes in the form and arrangement of the various parts may be made without departing from the spirit of my invention, and I reserve the right to make all such as fairly fall within the scope of the following claims.

I claim as my invention:

1. In apparatus of the class described, an operating shaft capable of simultaneous rotation and revolution, and a paddle shaft operatively connected to said operating shaft by a flexible joint.

2. In apparatus of the class described, an operating shaft, means for imparting to said shaft a combined rotation and revolution, and a paddle shaft connected by a universal joint to one end of said operating shaft.

3. In apparatus of the class described, a paddle shaft, a universally mounted bearing for said shaft located intermediate the ends thereof, a paddle on one end of said shaft, and means for imparting to said shaft a simultaneous rotation and conical movement.

4. In apparatus of the class described, a paddle shaft, a universally mounted bearing for said shaft located intermediate the ends thereof, a paddle on the lower end of said shaft, and means co-acting with the upper end of said shaft to impart thereto a simultaneous rotation and conical movement.

5. In an apparatus of the class described, an operating shaft, means for imparting to said shaft a simultaneous rotation and revolution, a paddle shaft forming an extension of said operating shaft and connected thereto by a universal joint, a bearing for said shaft located intermediate its ends, and a support for said bearing adapted to allow the same to tip in substantially all directions.

6. In an apparatus of the class described, an operating shaft, means for imparting to said shaft a simultaneous rotation and revolution, a paddle shaft forming an extension of said operating shaft and connected thereto by a universal joint, a bearing for said shaft located intermediate its ends, and a support for said bearing adapted to allow the same to tip in substantially all directions, said bearing being disposed in substantially the line of the axis of revolution of said operating shaft.

FREDERICK WESTERMAN.